United States Patent [19]

McPherson

[11] Patent Number: 4,790,102

[45] Date of Patent: Dec. 13, 1988

[54] MOLE TRAP

[76] Inventor: Samuel McPherson, 12080 Andersonville Rd., Davisburg, Mich. 48019

[21] Appl. No.: 72,731

[22] Filed: Jul. 13, 1987

[51] Int. Cl.⁴ .......................................... A01M 23/30
[52] U.S. Cl. .......................................... 43/86; 43/87
[58] Field of Search ............................... 43/86, 87, 85

[56] References Cited

U.S. PATENT DOCUMENTS

| 551,412 | 12/1895 | Stephens | 43/86 |
| 882,755 | 3/1908 | Hamilton | 43/86 |
| 1,049,406 | 1/1913 | Scheffer | 43/86 |
| 1,116,483 | 11/1914 | Putney | 43/86 |
| 2,348,002 | 5/1944 | Glass | 43/86 |

FOREIGN PATENT DOCUMENTS 19314 of 1903 United Kingdom ................. 43/86

Primary Examiner—Nicholas P. Godici
Assistant Examiner—Carmine Cuda
Attorney, Agent, or Firm—Barnes, Kisselle, Raisch, Choate, Whittemore & Hulbert

[57] ABSTRACT

A mole trap and the like comprising a base adapted to be placed on the ground, a pair of spring loaded levers pivoted to said base and movable from a latched position to an unlatched position, a flexible loop associated with each lever and adapted to extend into the ground transversely of a mole tunnel and a lever projecting into the tunnel and engageable by the mole in its travel through the tunnel to unlatch either of the levers and permit the spring associated with a lever to move the loop and engage and trap the mole.

14 Claims, 3 Drawing Sheets

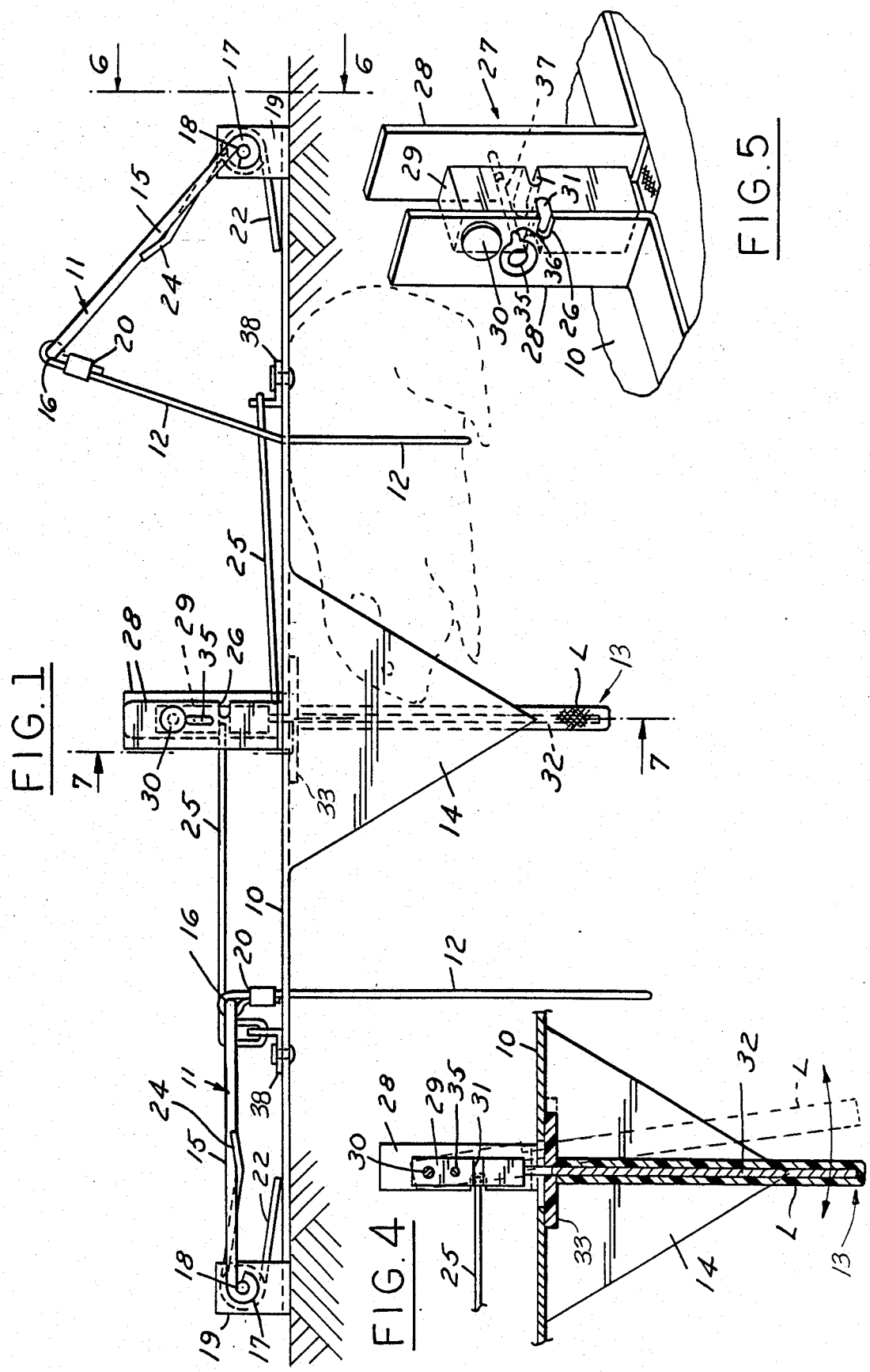

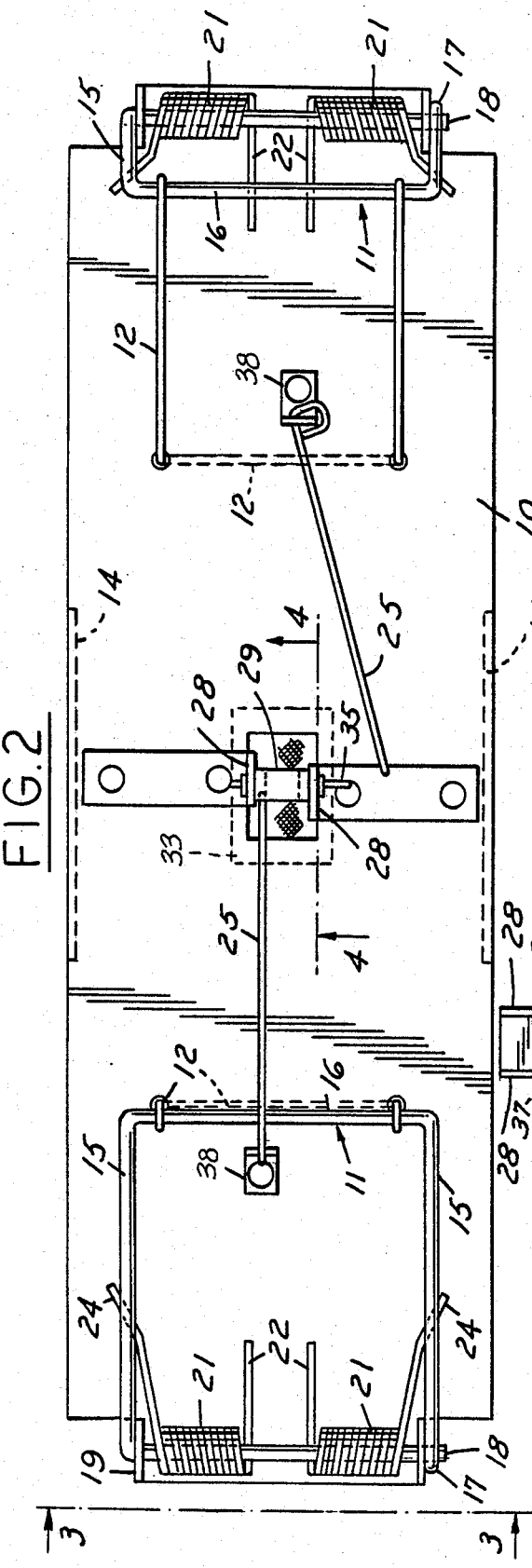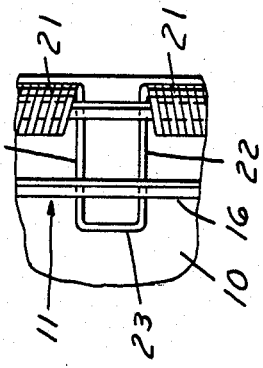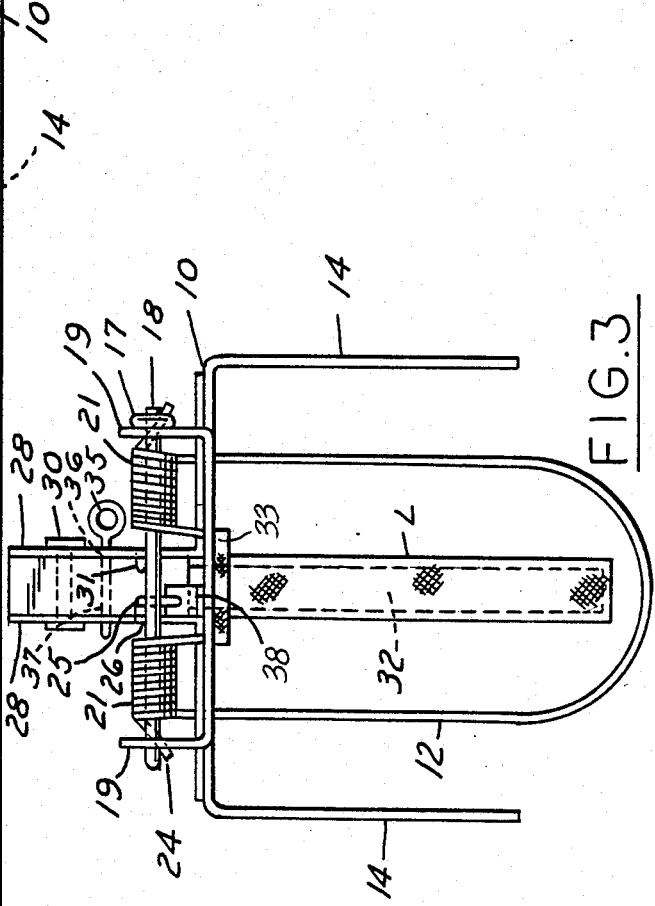

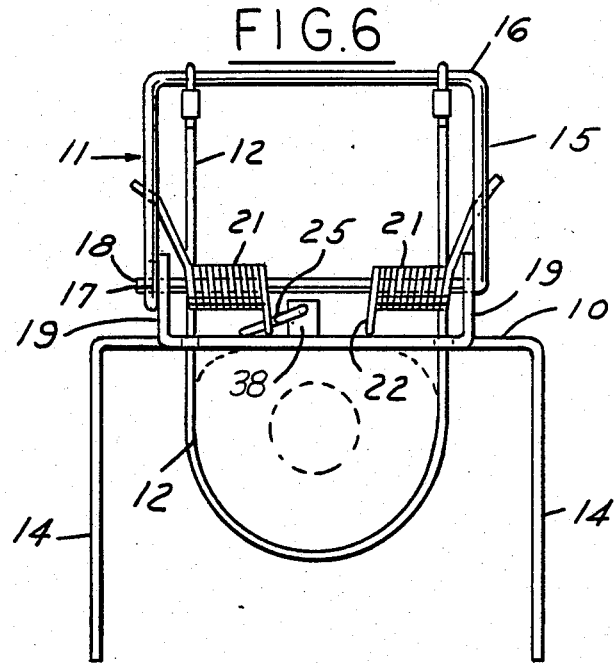
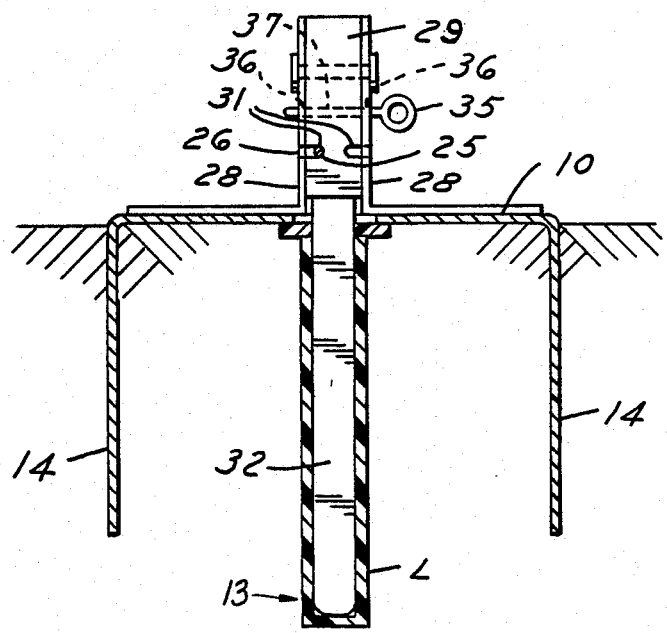

MOLE TRAP

This invention relates to mole traps.

BACKGROUND AND SUMMARY OF THE INVENTION

Burrowing animals such as moles have long been a problem in connection with gardens and lawns. The foremost animal which causes destruction in gardens and lawns is the ground mole. Various poisons have been developed and traps have been designed in an effort to control the mole. Commercially mole traps have included a loop extending into the ground and spring loaded to trap the mole when the pressure of movement of the mole through the mole tunnel is sensed. Patents showing such pressure actuated traps comprise U.S. Pat. No. 936,808. It has been suggested that some type of trigger be provided in the mole tunnel, as shown, for example, in U.S. Pat. Nos. 75,438, 549,977, 1,865,920, 1,918,582, 2,146,019, and 2,475,467.

Among the objectives of the present invention are to provide an improved mole trap which will effectively trap moles; which can also be utilized to trap other burrowing animals such as prairie dogs, gophers, groundhogs, rats and the like; which can not be readily sensed by the animal; which does not have any metal parts in the path of the animal; the presence of which is not readily determined by the animal; which is easily tripped by the animal from either direction of travel through the tunnel; and which is easily placed and low in cost.

In accordance with the invention, the mole trap comprises a base adapted to be placed on the ground, a pair of spring loaded levers pivoted to said base and movable from a latched position to an unlatched position, a loop associated with each lever and adapted to extend into the ground transversely of the mole tunnel and a lever projecting into the tunnel and engageable by the mole in its travel through the tunnel to unlatch either of the levers and permit the spring associated with lever to move the loop and engage and trap the mole.

DESCRIPTION OF THE DRAWINGS

FIG. 1 is a side view of a mole trap showing a mole trapped in the trap.

FIG. 2 is a plan view of the mole trap showing one position disengaged.

FIG. 3 is a view taken along the line 3—3 in FIG. 2.

FIG. 4 is a fragmentary sectional view taken along the line 4—4 in FIG. 2.

FIG. 5 is a fragmentary perspective view of a latching portion of the mole trap.

FIG. 6 is a fragmentary sectional view taken along the line 6—6 in FIG. 1.

FIG. 7 is a fragmentary sectional view taken along the line 7—7 in FIG. 1.

FIG. 8 is a fragmentary plan view of a modified mode trap.

DESCRIPTION

Referring to FIGS. 1-7, the mole trap embodying the invention comprises a base 10 adapted to be placed on the ground, a pair of spring loaded levers 11 pivoted to the base and movable outwardly and upwardly from a latched position adjacent the base to an unlatched position shown on the left in FIGS. 1 and 2 to an unlatched position shown on the right in FIGS. 1 and 2. A loop 12 is associated with each lever 11 and is adapted to extend into the ground transversely of a mole tunnel. A lever 13 projects into the tunnel and is engageable by the mole in its travel through the tunnel to unlatch either of the levers 11 and permit the spring associated with a lever 11 to move the loop 12 and engage and trap the mole.

More specifically the base 10 comprises a flat plate having triangular projections 14 extending at a right angle from the plate 10 which are adapted to engage and hold the base in the ground. Each lever 11 is in the form of a U-shaped wire loop having parallel side portions 15 connected by a cross portion 16. The free end 17 of one of the portions 15 is looped about the end of a wire shaft 18 which extends through brackets 19 to base 10. The free end of the other side portion 15 is integral with shaft 18.

Loop 12 is preferably made of plastic, such as nylon, and has its ends fastened to the central portion 16 of the lever by clasps 20. Each lever 11 is yieldingly urged toward an upward position as shown in FIG. 1 by tightly wound coil springs 21. Each spring 21 having one end 22 engaging the upper surface of plate 10 and the other end 24 engaging a side portion 15 of lever 11 to urge the respective lever 11 upwardly. Alternatively as shown in FIG. 8, the ends 23 are joined by an integral portion 22 that bears against the upper surface of plate 10.

A latch for each lever 11 comprises a straight wire 25 pivoted at one end to an upward projection 38 on the plate 10 by looping the end through an opening in the projection. The other free end of latch wire 25 is adapted to engage a slot 26 in a latch holder 27 on the upper surface of the plate 10. Latch holder 27 comprises spaced upright brackets 28. A trigger or trip member 29 is pivoted to brackets 28 by a pin 30, and includes slots 31 for engaging the ends of latch wires 25. Trip member 29 includes a portion 32 which extends downwardly through the base 10. The trip member portion 32 preferably has a layer L of insulating material, if it is made of metal, in order not to distract or indicate the presence of the trap to the mole. A layer 33 of material such as foam is interposed at the base 10 about portion 32 to exclude the passage of light into the tunnel. A safety pin 35 extends through openings 36 in brackets 28 and opening 37 latch trigger member 29 to hold the levers 11 in locked position until the trap has been placed in the ground.

Initially, the trap is laid on its side on the ground, a center hole is carefully made in the mole tunnel or burrow with a spoon or similar object for the trigger member 32 and for the loops 12 and the set trap is placed into these holes and pushed flat onto the ground so that no light enters the tunnel or burrow. The safety pin 35 is disengaged and the trap is then ready for action.

When a mole or other animal moves through its tunnel from either direction it moves into one of said loops and engages the trip member 32 unlatching the lever associated with the loop into which it has moved causing a loop to trap it.

It can thus be seen that there has been provided a trap which will effectively trap moles; which can also be utilized to trap other burrowing animals such as prairie dogs, gophers, groundhogs, rats and the like; which can not be readily sensed by the animal; which does not have any metal parts in the path of the animal; the presence of which is not readily determined by the animal; which is easily tripped by the animal from either direction of travel through the tunnel; and which is easily placed and low in cost.

In accordance with the invention, a mole trap comprising a base adapted to be placed on the ground, a pair of spring loaded levers pivoted to said base and movable from a latched position to an unlatched position, a loop associated with each lever and adapted to extend into the ground transversely of the mole tunnel and a lever projecting into the tunnel and engageable by the mole in its travel through the tunnel to unlatch either of the levers and permit the spring associated with lever to move the loop and engage and trap the mole.

What is claimed is:

1. A mole trap and the like comprising
  a base adapted to be placed on the ground,
  a pair of spring loaded levers pivoted to said base and movable from a latched position to an unlatched position,
  a pair of flexible non-metallic loops, one loop being associated with each said lever and adapted to extend below said base into the ground transversely of a mole tunnel,
  a pair of latches, each latch engaging a respective one of said levers and holding its respective loop in the path of a mole approaching in either direction along the tunnel, and
  a single trip member projecting into the tunnel and adapted to be engaged by the mole in its travel through the tunnel after it has moved into either one of said loops to selectively unlatch the lever associated with that loop and permit the spring associated with the unlatched lever to move that loop and engage and trap the mole.

2. The mole trap set forth in claim 1 wherein said loop has its ends connected to a central portion of its respective lever.

3. The mole trap set forth in claim 1 wherein said latch comprises
  a wire member pivoted to said base above said base and adapted to extend over the central portion of the lever and a trigger body connected to the trip member and pivoted on said base,
  said trip member having a slot engageable by the free end of said latch member.

4. The mole trap set forth in claim 1 comprising non-metallic insulating material on at least the portion of said trip member below said base.

5. The mole trap set forth in claim 1 wherein said spring loaded levers comprise a pair of coil springs associated with each said lever, each said spring having one end engaging the center of said base above said base and another end engaging a respective side portion of said respective lever above said base.

6. The mole trap set forth in claim 5 wherein said one end of one said spring which engages the center of said base is connected by an integral portion with said one end of the other said spring which engages the center of said base.

7. The mole trap set forth in claim 1 wherein said base comprises a plate having a centrally located opening through which said trip member projects into the tunnel below said plate and means on the upper surface of said plate from which said trip member is pivoted.

8. The mole trap set forth in claim 7 wherein said means comprises an upstanding portions onto which said trip member is pivoted.

9. The mole trap set forth in claim 7 including means about the trip member adjacent said plate for excluding light from entering the mole tunnel through said centrally located opening.

10. A mole trap and the like comprising
  a flat base adapted to engage the ground and having projections for extending into the ground,
  a pair of levers,
  each lever being generally U-shaped and comprising side portions and a central portion connecting one end of the side portions,
  means pivoting the other end of said side portions of each lever to the upper surface of the base,
  a pair of loops, each loop comprising a flexible non-metallic member having its ends pivoted to the central portion of a respective one of said levers and extending below said base through spaced openings in the base,
  coil springs associated with each lever and having one end contacting the upper surface of the base and the other end engaging the side portions of the respective lever for urging the lever upwardly relative to the upper surface of the base,
  a pair of latch members, each comprising a wire individual to each said lever and adapted to extend over the lever to hold the lever downwardly,
  a single trip member means pivoting said trip member on the upper surface of said base and having a pair of slots, each being respectively engageable by a free end of said wire individual to each said latch member, and
  said trip member having a portion extending below said base through an opening in said base and adapted to be engaged by an animal moving in either direction through a tunnel extending longitudinally to the base whereby after the animal has moved into either of said loops and has tripped the trip member a selective one of said levers unlatches and traps the animal within its respective loop.

11. The mole trap set forth in claim 10 wherein said trip member is supported for pivotal movement between upright brackets.

12. The mole trap set forth in claim 11 wherein said brackets include slots coaligned with the slots in said trip member.

13. The mole trap set forth in claim 12 including aligned openings in said brackets and said trip member and a pin extending through said openings for holding said latch members in latched positions.

14. A mole trap and the like comprising
  a flat base adapted to engage the ground and having projections for extending into the ground,
  a pair of levers,
  each lever being generally U-shaped and comprising side portions and a central portion connecting one end of the side portions,
  means pivoting the other end of said side portions of each lever to the upper surface of the base,
  a pair of loops, each loop comprising a flexible non-metallic member having its ends pivoted to the central portion of a respective one of said levers and extending below said base through spaced openings in the base,
  a pair of coil springs associated with each said lever, each said spring having one end engaging the center of said base above said base and another end engaging a respective side portion of said respective lever above said base, a pair of latch members, each comprising a wire individual to each said lever and adapted to extend over the lever to hold the lever downwardly,
a single trip member pivoted to upright portions on said base and having a pair of slots, each being respectively engageable by a free end of said wire individual to each said latch member,
said base having an opening,
said trip member having a portion extending below said base through said opening in said base and adapted to be engaged by an animal moving in either direction through a tunnel extending longitudinally to the base,
non-metallic insulating material on at least the portion of said trip member below said base, and
means about the trip member adjacent said base for excluding light from entering the mole tunnel through said opening, whereby after the animal has moved into either of said loops and has tripped the trip member a selective one of said levers unlatches and traps the animal within its respective loop.

* * * * *